United States Patent
Zhu et al.

(10) Patent No.: US 12,525,290 B2
(45) Date of Patent: Jan. 13, 2026

(54) READ-OUT CIRCUITS FOR RRAM-BASED CROSSBAR CIRCUITS

(71) Applicant: TetraMem Inc., Fremont, CA (US)

(72) Inventors: Hengfang Zhu, Fremont, CA (US); Wenbo Yin, Alameda, CA (US); Ning Ge, Danville, CA (US)

(73) Assignee: TetraMem Inc., San Jose, CA (US)

( * ) Notice: Subject to any disclaimer, the term of this patent is extended or adjusted under 35 U.S.C. 154(b) by 41 days.

(21) Appl. No.: 18/587,561

(22) Filed: Feb. 26, 2024

(65) Prior Publication Data

US 2025/0273268 A1    Aug. 28, 2025

(51) Int. Cl.
    *G11C 11/00*      (2006.01)
    *G11C 13/00*      (2006.01)

(52) U.S. Cl.
    CPC ........ *G11C 13/004* (2013.01); *G11C 13/0026* (2013.01)

(58) Field of Classification Search
CPC . G11C 13/004; G11C 13/0026; G11C 13/003; G11C 2213/79; G11C 2013/0045; G11C 11/1673; G11C 13/0007; G11C 2013/0054; G11C 13/0028; G11C 13/0069
See application file for complete search history.

(56) References Cited

U.S. PATENT DOCUMENTS

| | | | |
|---|---|---|---|
| 10,804,324 B1 | 10/2020 | Zhang et al. | |
| 11,562,788 B2 * | 1/2023 | Lu | G11C 13/0069 |
| 11,610,105 B2 * | 3/2023 | Kumar | G11C 13/004 |
| 2018/0114569 A1 * | 4/2018 | Strachan | G11C 11/54 |
| 2019/0140022 A1 | 5/2019 | Jeong et al. | |
| 2020/0411091 A1 | 12/2020 | Hwang | |
| 2021/0266000 A1 | 8/2021 | Ge | |
| 2022/0173315 A1 | 6/2022 | Zhang et al. | |
| 2022/0293173 A1 | 9/2022 | Hu et al. | |
| 2022/0399899 A1 | 12/2022 | Ge et al. | |
| 2024/0379140 A1 * | 11/2024 | Zhu | G11C 13/0026 |
| 2024/0412783 A1 * | 12/2024 | Hu | G06N 3/065 |
| 2025/0037763 A1 | 1/2025 | Yin et al. | |
| 2025/0069655 A1 | 2/2025 | Zhu et al. | |

OTHER PUBLICATIONS

Levisse et al. "Architecture, design and technology guidelines for crosspoint memories," 2018 IEEE/ACM International Symposium on Nanoscale Architectures (NANOARCH), IEEE, 2018. Retrieved on Apr. 5, 2025 (Apr. 5, 2025).

* cited by examiner

*Primary Examiner* — Hien N Nguyen
(74) *Attorney, Agent, or Firm* — Jaffery Watson Hamilton & DeSanctis LLP

(57) ABSTRACT

The present disclosure provides read-out circuits for crossbar circuits. A crossbar circuit may include a plurality of bit lines intersecting with a plurality of word lines and a plurality of cross-point devices. Each of the plurality of cross-point devices is connected to at least one of the plurality of word lines and at least one of the plurality of bit lines. The crossbar circuit may further include an output sensor that generates a digital output representative of a sum of currents flowing through one or more bit lines of the crossbar circuit. The output sensor includes a first transistor serially connected to a second transistor and an analog-to-digital converter configured to output the digital output. The read-out circuit is an open loop circuit. The read-out circuit may be selectively connected to one of the plurality of bit lines to perform a read operation.

10 Claims, 5 Drawing Sheets

READ-OUT CIRCUITS FOR RRAM-BASED CROSSBAR CIRCUITS

TECHNICAL FIELD

The implementations of the disclosure relate generally to electronic circuits and, more specifically, to read-out circuits for crossbar circuits including resistive random-access memory (RRAM or ReRAM) devices.

BACKGROUND

A crossbar circuit may refer to a circuit structure with interconnecting electrically conductive lines sandwiching a memory element, such as a resistive switching material, at their intersections. The resistive switching material may include, for example, a memristor (also referred to as resistive random-access memory (RRAM or ReRAM)). Crossbar circuits may be used to implement in-memory computing applications, non-volatile solid-state memory, image processing applications, neural networks, etc.

SUMMARY

The following is a simplified summary of the disclosure to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

According to one or more aspects of the present disclosure, an apparatus is provided. The apparatus includes a plurality of bit lines intersecting with a plurality of word lines, a plurality of cross-point devices, and at least one output sensor that generates a digital output representative of a sum of currents flowing through a first bit line of the plurality of bit lines. Each of the plurality of cross-point devices is connected to at least one of the plurality of word lines and at least one of the plurality of bit lines. The output sensor includes a first transistor serially connected to a second transistor and an analog-to-digital converter configured to output the digital output.

In some embodiments, a drain of the first transistor is connected to an input of the analog-to-digital converter.

In some embodiments, the drain of the first transistor is further connected to a drain of the second transistor.

In some embodiments, the output sensor further includes a first resistor, wherein the drain of the first transistor is connected to the source of the second transistor via the first resistor.

In some embodiments, a gate of the first transistor is connected to a bit line reference voltage.

In some embodiments, a gate of the second transistor is connected to a second bit line of the plurality of bit lines.

In some embodiments, a source of the second transistor is connected to a voltage supply via a second resistor.

In some embodiments, the apparatus further includes a first plurality of switches configured to selectively connect the plurality of bit lines to a gate of the second transistor.

In some embodiments, the apparatus further includes a second plurality of switches configured to selectively connect the plurality of bit lines to a source of the first transistor.

In some embodiments, the input of the analog-to-digital converter is further connected to a first terminal of a capacitor.

In some embodiments, a second terminal of the capacitor is connected to ground.

In some embodiments, the cross-point devices include at least one of a memristor, a phase-change memory (PCM) device, a floating gate device, a spintronic device, a ferroelectric device, or a resistive random-access memory (RRAM) device.

BRIEF DESCRIPTION OF THE DRA WINGS

The disclosure will be understood more fully from the detailed description given below and from the accompanying drawings of various embodiments of the disclosure. The drawings, however, should not be taken to limit the disclosure to the specific embodiments, but are for explanation and understanding.

DETAILED DESCRIPTION

Figure 1:
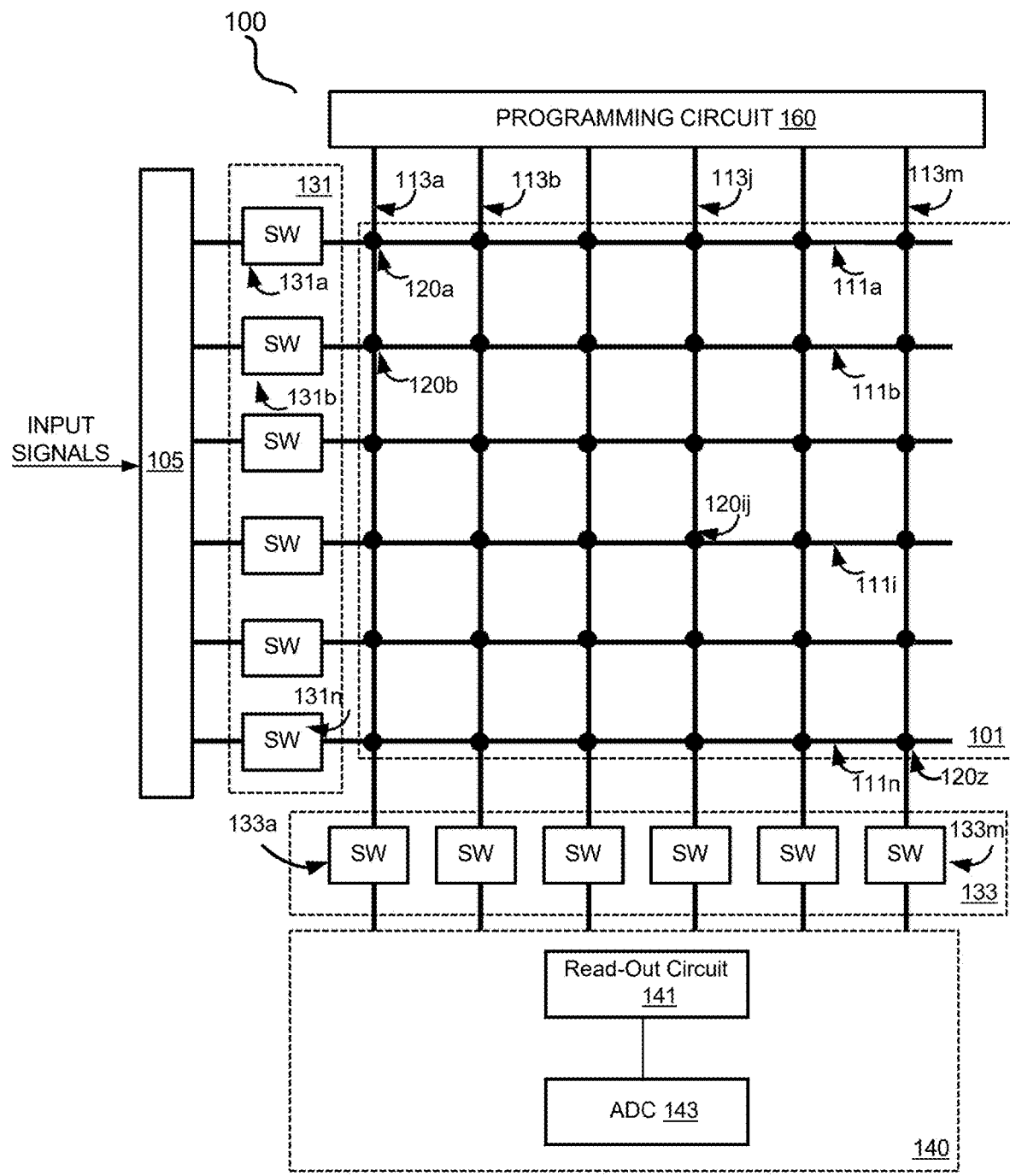
FIG. 1 is a diagram illustrating an example of a crossbar circuit in accordance with some embodiments of the present disclosure.

Aspects of the disclosure provide read-out circuits for crossbar circuits including resistive random-access memory (RRAM or ReRAM) devices. A crossbar circuit may include intersecting electrically conductive wires (e.g., row lines, column lines, etc.) and cross-point devices arranged in one or more arrays. Each of the cross-point devices may be connected to a word line, a bit line, and a select line. The cross-point devices may include, for example, a phase-change memory (PCM) device, a floating gate device, a spintronic device, a ferroelectric device, a resistive random-access memory (RRAM) device, etc. The crossbar circuits may be used for multi-level memory (MLM) circuits and in-memory computing (IMC) circuits.

Conventional crossbar circuits typically employ operational amplifier (op-amp)-based read-out circuits to convert either memory cell current or accumulated array current into a voltage first, and then utilize an ADC to convert the voltage into digital outputs. The slew rate and bandwidth of the op-amp design constrain the speed of the read operation for MLM circuits or the speed of the vector-matrix multiplication (VMM) operation for IMC circuits. Open-loop read-out circuits can settle much faster with significantly lower power consumption. However, traditional open-loop circuits generally exhibit poor linearity and accuracy. Additionally, these circuits are susceptible to device mismatches and process, voltage, and temperature (PVT) variations. Moreover, adjusting the gain of open-loop circuits without significantly impacting linearity is challenging. While variable gain is advantageous for certain applications, it poses challenges in open-loop circuit design.

The present disclosure provides open-loop read-out circuits that may be incorporated into a crossbar circuit. In some embodiments, a read-out circuit may include two serially connected transistors. The gate of the first transistor is connected to a reference voltage. The source of a second transistor in the read-out circuit may be connected to the drain of the first transistor. The connection point of the source of second transistor and the drain of first transistor may be selectively connected to an input of an analog-to-digital converter (ADC). The ADC may output a digital signal representative of the current flowing through the bit line. In some embodiments, the source of the second transistor is connected to a resistor, which is further connected to the drain of the first transistor. The resistance of the resistor may be adjusted to change the gain of the read-out circuit without affecting the linearity of the circuit. The read-out circuit may be selectively connected to a bit line to perform a read operation.

The open-loop read-out circuits provided herein offer several advantages over traditional closed-loop circuits for bit line (BL) settling. First, the settling time is no longer limited by the bandwidth of the op-amp, leading to a faster response. Second, the circuit consumes no extra power, making it more energy efficient. Additionally, the circuit requires only two transistors and two resistors, resulting in a smaller footprint. Furthermore, the open-loop design eliminates the stability issues commonly encountered in closed-loop circuits. Lastly, the output voltage exhibits a linear relationship with the BL current, similar to the closed-loop scheme. Moreover, the output swing can be adjusted without compromising the circuit's linearity, providing greater flexibility.

FIG. 1 is a diagram illustrating an example 100 of a crossbar circuit in accordance with some embodiments of the present disclosure. As shown, crossbar circuit 100 may include a plurality of interconnecting electrically conductive wires, such as one or more row wires 111$a$, 111$b$, . . . , 111$i$, . . . , 111$n$, and column wires 113$a$, 113$b$, . . . , 113$j$, . . . , 113$m$ for an n-row by m-column crossbar array. The crossbar circuit 100 may further include cross-point devices 120$a$, 120$b$, . . . , 120$z$, etc. Each of the cross-point devices may connect a row wire and a column wire. For example, the cross-point device 120$ij$ may connect the row wire 111$i$ and the column wire 113$j$. The number of the column wires 113$a$-$m$ and the number of the row wires 111$a$-$n$ may or may not be the same. Crossbar circuit 100 may further include a word line (WL) logic 105 that is connected to the cross-point devices via the row wires 111$a$-$n$. The WL logic 105 may include any suitable component for applying input signals to selected cross-point devices via row wires 111$a$-$n$, such as one or more digital-to-analog converters (DACs), amplifiers, etc. Each of the input signals may be a voltage signal, a current signal, etc.

Row wires 111$a$-$n$ may include a first row wire 111$a$, a second row wire 111$b$, . . . , 111$i$, . . . , and an n-th row wire 111$n$. Each of row wires 111$a$, . . . , 111$n$ may be and/or include any suitable electrically conductive material. In some embodiments, each row wire 111$a$-$n$ may be a metal wire.

Column wires 113$a$-113$m$ may include a first column wire 113$a$, a second column wire 113$b$, . . . , and an m-th column wire 113$m$. Each column wire 113$a$-$m$ may be and/or include any suitable electrically conductive material. In some embodiments, each column wire 113$a$-$m$ may be a metal wire. In some embodiments, each row wire 111$a$-$n$ may be a word line, and each column wire 113$a$-$m$ may be a bit line.

Each cross-point device 120$a$-120$z$ may be and/or include any suitable device with tunable resistance, such as a memristor, phase-change memory (PCM) devices, floating gates, spintronic devices, ferroelectric devices, RRAM devices, etc.

Each row wire 111$a$-111$n$ may be connected to one or more row switches 131 (e.g., row switches 131$a$, 131$b$, . . . , 131$n$). Each row switch 131 may include any suitable circuit structure that may control the current flowing through row wires 111$a$-111$n$. For example, row switches 131 may be and/or include a CMOS switch circuit.

Each column wire 113$a$-$m$ may be connected to one or more column switches 133 (e.g., switches 133$a$, . . . , 133$m$). Each column switch 133$a$-133$m$ may include any suitable circuit structure that may control current passing through column wires 113$a$-$m$. For example, column switches 133$a$-$m$ may be and/or include a CMOS switch circuit. In some embodiments, one or more of switches 131$a$-$n$ and 133$a$-$m$ may further provide fault protection, electrostatic discharge (ESD) protection, noise reduction, and/or any other suitable function for one or more portions of crossbar circuit 100.

Output sensor(s) 140 may convert the current flowing through column wires 113$a$-$m$ into the output signal. For example, output sensor(s) 140 may include a read-out circuit 141 that may convert the current flowing through a respective column wire into a respective voltage signal. Output sensor(s) 140 may further include an analog-to-digital converter (ADC) 143 that may convert the voltage signal into a digital output. In some embodiments, output sensor(s) 140 may further include one or more multiplexers (not shown). In some embodiments, output sensor(s) 140 may include the output sensor 320 of FIG. 3 and/or the output sensor 420 of FIG. 4.

Programming circuit 160 may program the cross-point devices 120$a$-$z$ selected by switches 131 and/or 133 to suitable conductance values. For example, programming a cross-point device may involve applying a suitable voltage signal or current signal across the cross-point device. The resistance of each cross-point device may be electrically changed between high-resistance and low-resistance. Setting a cross-point device may involve changing the resistance of the cross-point from high-resistance to low-resistance. Resetting the cross-point device may involve changing the resistance of the cross-point from low-resistance to high-resistance.

Crossbar circuit 100 may perform parallel weighted voltage multiplication and current summation. For example, an input voltage signal may be applied to one or more rows of crossbar circuit 100 (e.g., one or more selected rows). The input signal may flow through the cross-point devices of the rows of the crossbar circuit 100. The conductance of the cross-point device may be tuned to a specific value (also referred to as a "weight"). By Ohm's law, the input voltage multiplies the cross-point conductance and generates a current from the cross-point device. By Kirchhoff's law, the sum of the currents passes through the activated cross-point devices on a respective column (also referred to as the "bit line current"), which may be read from the column. According to Ohm's law and Kirchhoff's current law, the input-output relationship of the crossbar array can be represented as I=VG, wherein I represents the output signal matrix as current; V represents the input signal matrix as voltage; and G represents the conductance matrix of the cross-point devices. As such, the input signal is weighted at each of the cross-point devices by its conductance according to Ohm's law. The weighted current (the "bit line current") is output via each column wire and may be accumulated according to Kirchhoff's current law. This may enable in-memory computing (IMC) via parallel multiplications and summations performed in the crossbar arrays.

Crossbar circuit 100 may be configured to perform vector-matrix multiplication (VMM). A VMM operation may be represented as Y=XA, wherein each of Y, X, A represents a respective matrix. More particularly, for example, input vector X may be mapped to the input voltage V of crossbar circuit 100. Matrix A may be mapped to conductance values G. The output current I may be read and mapped back to output results Y. In some embodiments, crossbar circuit 100 may be configured to implement a portion of a neural network by performing VMMs.

In some embodiments, crossbar circuit 100 may perform convolution operations. For example, performing 2D convolution on input data may involve applying a single convolution kernel to the input signals. Performing a depthwise convolution on the input data may involve convolving each channel of the input data with a respective kernel corresponding to the channel and stacking the convolved outputs together. The convolution kernel may have a particular size defined by multiple dimensions (e.g., a width, a height, a channel, etc.). The convolution kernel may be applied to a portion of the input data having the same size to produce an output. The output may be mapped to an element of the convolution result that is located at a position corresponding to the position of the portion of the input data.

Figure 2A:
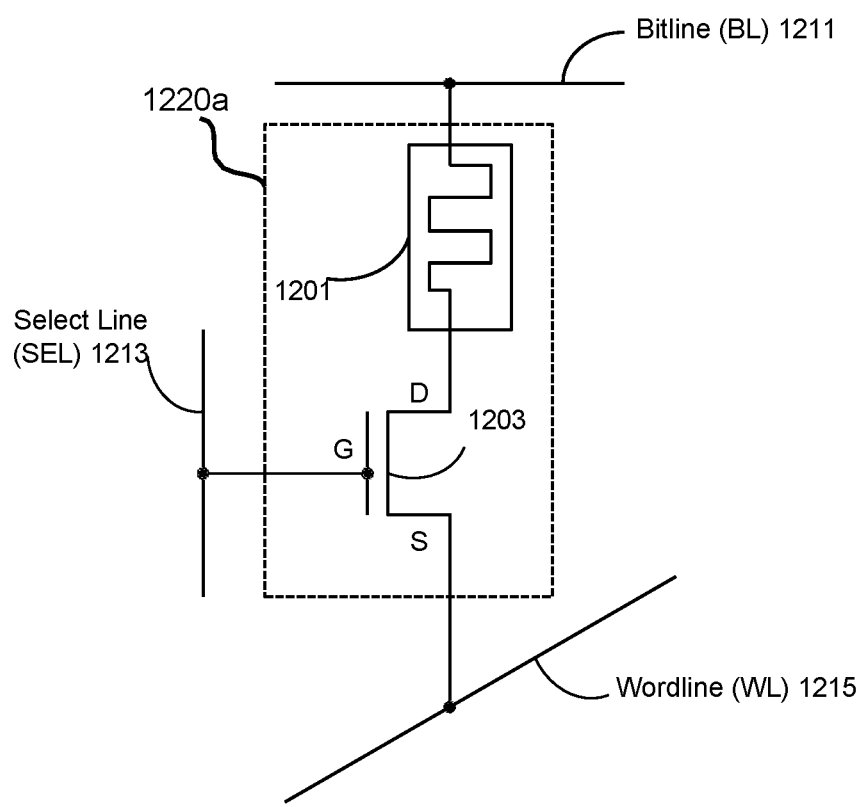
FIGS. 2A and 2B are schematic diagrams illustrating example cross-point devices in accordance with some embodiments of the present disclosure.
Figure 2B:
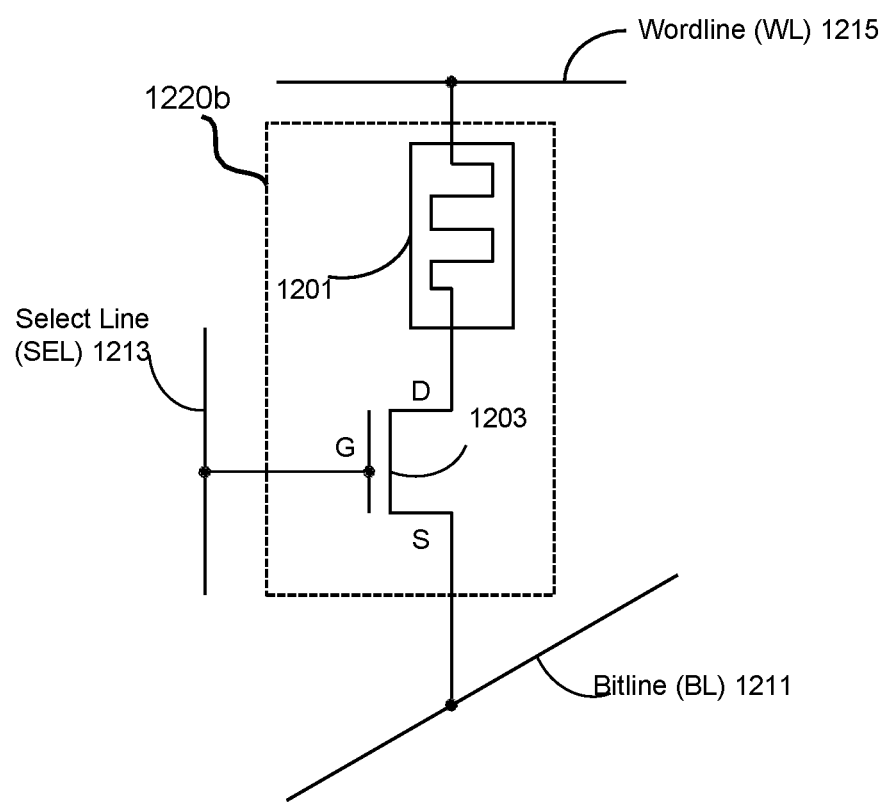

FIGS. 2A and 2B are schematic diagrams illustrating example cross-point devices 1220a and 1220b in accordance with some embodiments of the present disclosure. Cross-point device 1220a and cross-point device 1220b may be referred to as a 1-transistor-1-resistor (1T1R) configuration.

As shown in FIGS. 2A and 2B, a cross-point device 1220a or 1220b may include an RRAM device 1201 and a transistor 1203 that are connected in series. A transistor may include four terminals that may be marked as gate (G), source (S), drain (D), and bulk (B) (not shown in FIGS. 2A and 2B), respectively. Referring to FIG. 2A, the first terminal of RRAM device 1201 may be connected to the drain of transistor 1203. A second terminal of RRAM device 1201 may be connected to a bit line 1211. The source of the transistor 1203 may be connected to a word line 1215. The gate of transistor 1203 may be connected to a select line 1213.

As shown in FIG. 2B, the second terminal of RRAM device 1201 may be connected to the word line 1215, and the source of the transistor 1203 may be connected to a bit line 1211 in some embodiments. Word line 1215 may correspond to a row wire 111a-n of FIG. 1. Bit line 1211 may correspond to a column wire 123a-m of FIG. 1.

Transistor 1203 may function as a selector as well as a current controller and may set the current compliance to RRAM device 1201 during programming. The gate voltage on transistor 1203 can set current compliances to cross-point device 1220a-b during programming and can thus control the conductance and analog behavior of cross-point device 1220a-b. For example, when cross-point device 1220a-b is set from a high-resistance state to a low-resistance state, a set signal (e.g., a voltage signal, a current signal) may be provided via bit line (BL) 1211 or word line (WL) 1215. Another voltage, also referred to as a select voltage or gate voltage, may be applied via select line (SEL) 1213 to the transistor gate to open the gate and set the current compliance, while word line (WL) 1215 or bit line (BL) 1211 may be grounded. When cross-point device 1220a-b is reset from the low-resistance state to the high-resistance state, a gate voltage may be applied to the gate of transistor 1203 via select line 1213 to open the transistor gate. Meanwhile, a reset signal may be sent to RRAM device 1201 via word line 1215 or bit line 1211, while bit line 1211 or word line 1215 may be grounded.

Figure 3:
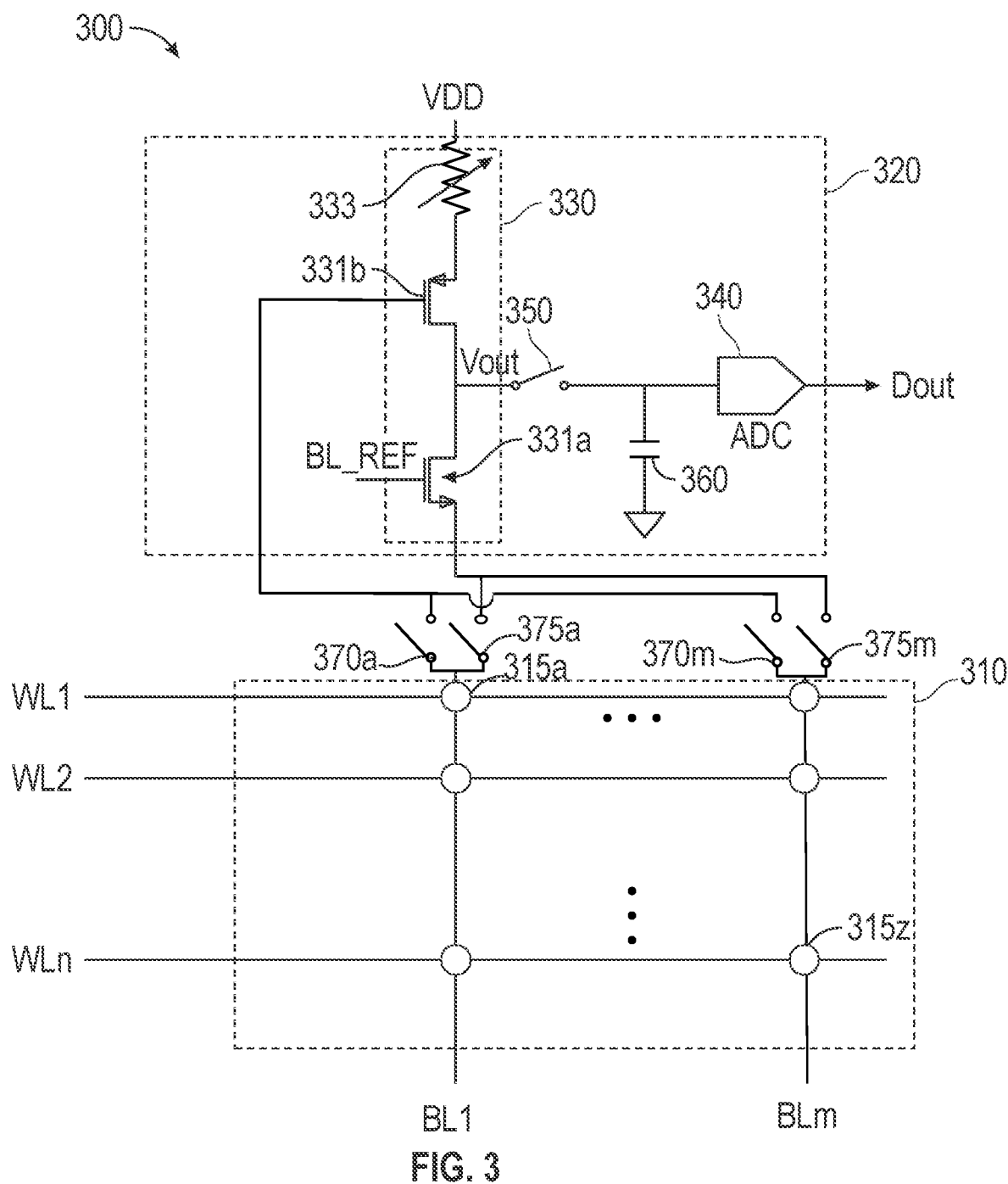
FIG. 3 is a circuit diagram illustrating an example crossbar circuit in accordance with one implementation of the present disclosure.

FIG. 3 is a circuit diagram illustrating an example crossbar circuit 300 in accordance with one implementation of the present disclosure.

As shown, crossbar circuit 300 may include a crossbar array 310 and an output sensor 320. Crossbar array 310 may include a plurality of word lines (WL1, WL2, . . . , WLn) interconnecting with a plurality of bit lines (e.g., BL1, . . . , BLm). Crossbar array 310 may further include a plurality of cross-point devices 315a, . . . , 315z, each of which is connected to at least one of the word lines and at least one of the bit lines. Crossbar array 310 may be and/or include the crossbar array 101 of FIG. 1.

The output sensor 320 may include a read-out circuit 330 and an ADC 340. Read-out circuit 330 may be selectively connected to an input of ADC 340 via a switch 350 to provide a voltage signal Vout to ADC 340. ADC 340 may convert the voltage signal Vout into a digital signal Dout. Output sensor 320 may further include one or more suitable capacitors 360 connected to ADC 340 in some embodiments. In some embodiments, a first terminal of capacitor 360 may be connected to the input of ADC 340. A second terminal of capacitor 360 may be connected to ground Read-out circuit 330 may include a first transistor 331a, a second transistor 331b, and one or more resistors 333. As shown, resistor 333 is connected between a voltage supply VDD and the source of the second transistor 331b. First transistor 331a and second transistor 331b may be serially connected to each other. For example, the drain of the second transistor 331b is connected to the drain of the first transistor 331a. The gate of transistor 331a is connected to a reference voltage BL_REF. The connection point of the source of second transistor 331b and the drain of first transistor 331a may provide the output voltage Vout.

Read-out circuit 330 may be selectively connected to a bit line BL1, . . . , BLm to perform a read operation. In some embodiments, crossbar circuit 300 may include a plurality of sets of switches configured to selectively connect a bit line to read-out circuit 330. For example, crossbar circuit 300 may include a first plurality of switches (e.g., switches 370a, . . . , 370m) configured to connect a respective bit line of bit lines BL1, . . . , BLm to the gate of the second transistor 331b and a second plurality of switches (e.g., switches 375a, . . . 375m) configured to connect a respective bit line of bit lines BL1, . . . , BLm to the source of the first transistor 331a. For example, read-out circuit 330 may be connected to bit line BL1 via switches 370a and 375a (e.g., by closing both switches 370a and 375a). Switches 370a and 375a may selectively connect bit line BL1 to the gate of the second transistor 331b and the source of the first transistor 331a, respectively. As another example, read-out circuit 330 may be connected to bit line BLm via switches 370m and 375m (e.g., by closing both switches 370m and 375m). Switches 370m and 375m may selectively connect bit line BLm to the gate of the second transistor 331b and the source of the first transistor 331a, respectively. In some embodiments, read-out circuit 330 is configured to be connected to only one selected bit line during a read operation (e.g., by closing the set of switches connected to the selected bit line and opening the sets of switches connected to the other bit lines).

As the BL current increases, the Vdsat (drain-to-source saturation voltage) of the first transistor 331a increases, causing a decrease in BL voltage. Without the second transistor 331b, the reduction in BL voltage reduces the cell current, leading to an increase in the output voltage of the read-out circuit. The presence of the second transistor 331b may effectively compensate for the variations in the output voltage Vout that would otherwise occur due to bit line current variations in the open-loop circuit. Resistor 333 can be used to adjust the linearity of the output voltage.

Figure 4:
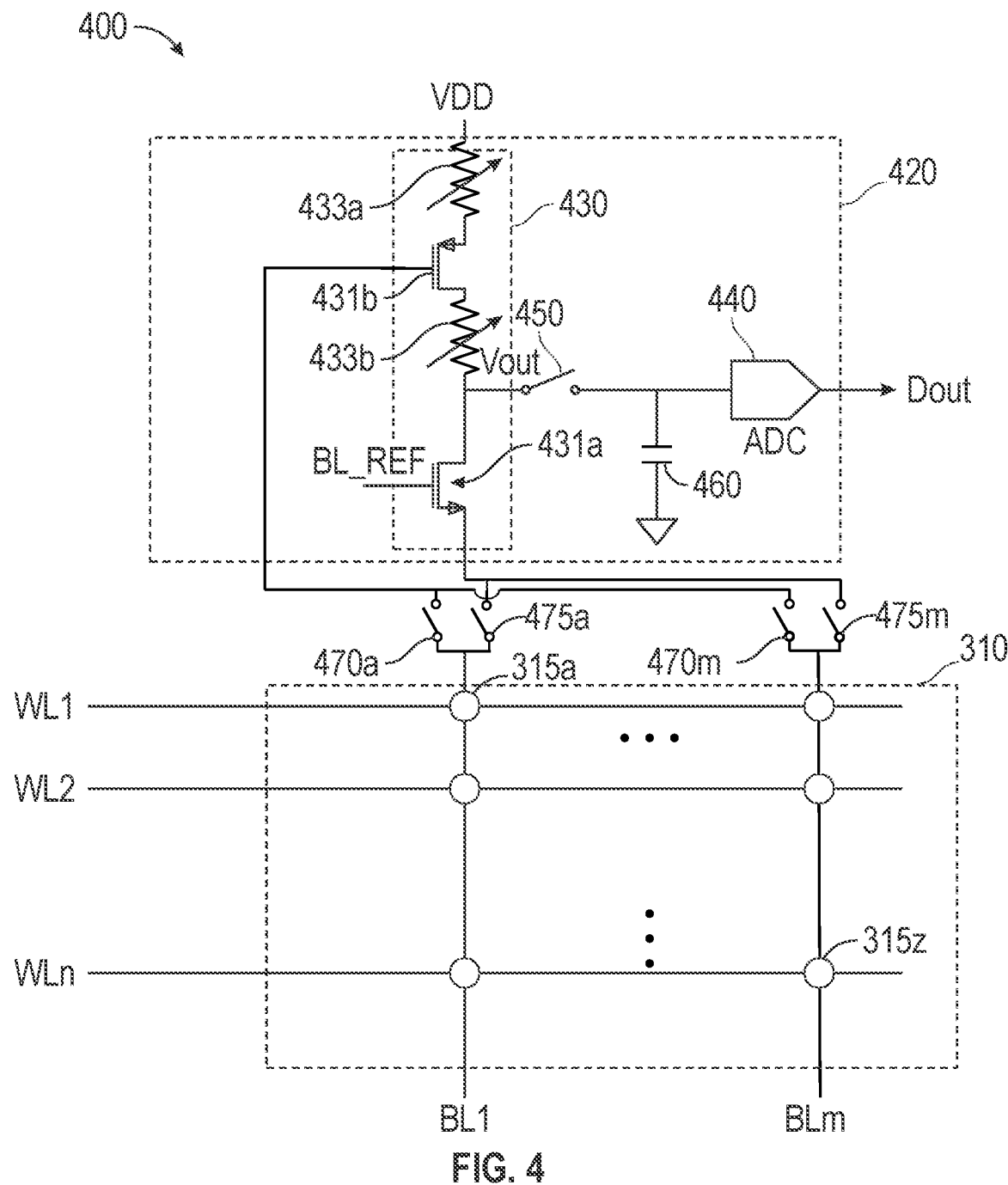
FIG. 4 is a circuit diagram illustrating an example crossbar circuit in accordance with another implementation of the present disclosure.

FIG. 4 is a circuit diagram illustrating an example crossbar circuit 400 in accordance with another implementation of the present disclosure.

As shown, crossbar circuit 400 may include crossbar array 310 and an output sensor 420. The output sensor 420 may include a read-out circuit 430 and an ADC 440. Read-out circuit 430 may be selectively connected to ADC 440 via a switch 450 to provide a voltage signal Vout to ADC 440 as an input. ADC 440 may convert the voltage signal Vout into a digital signal. Output sensor 420 may further include one or more suitable capacitors 460 connected to ADC 440 in some embodiments.

Read-out circuit 430 may include a first transistor 431a, a second transistor 431b, and resistors 433a and 433b. As shown, first transistor 431a and second transistor 431b may be serially connected to each other. The drain of the second transistor 431b is connected to resistor 433b (also referred to as the "first resistor"), which is further connected to the drain of first transistor 431a. The source of the first transistor 431a is connected to a first bit line. The gate of transistor 431a is connected to a reference voltage BL_REF which might be a baseline reference voltage used to control the operation of the first transistor 431a. The connection point of the first resistor 433b and the drain of the first transistor 431a may provide the output voltage Vout. Resistor 433a (also referred to as the "second resistor") is connected between a voltage supply VDD and the source of the second transistor 431b. Resistors 433a and/or 433b may be variable resistors with adjustable resistance.

The resistance of resistor 433b can be changed to adjust the gain of the read-out circuit 430 without affecting its linearity. The addition of a passive resistor (i.e., resistor 433b) to the read-out circuit may create a knob for gain adjustment with little linearity impact.

Read-out circuit 430 may be selectively connected to a bit line BL1, . . . , BLm to perform a read operation. In some embodiments, crossbar circuit 400 may include a plurality of sets of switches configured to selectively connect a bit line to read-out circuit 430. For example, crossbar circuit 400 may include a first plurality of switches (e.g., switches 470a, . . . , 470m) configured to connect a respective bit line of bit lines BL1, . . . , BLm to the gate of the second transistor 431b and a second plurality of switches (e.g., switches 475a, . . . , 475m) configured to connect a respective bit line of bit lines BL1, . . . , BLm to the source of the first transistor 431a. For example, read-out circuit 430 may be connected to bit line BL1 via switches 470a and 475a (e.g., by closing both switches 470a and 475a). Switches 470a and 475a may selectively connect bit line BL1 to the gate of the second transistor 431b and the source of the first transistor 431a, respectively. As another example, read-out circuit 430 may be connected to bit line BLm via switches 470m and 475m (e.g., by closing both switches 470m and 475m). Switches 470m and 475m may selectively connect bit line BLm to the gate of the second transistor 431b and the source of the first transistor 431a, respectively. In some embodiments, read-out circuit 430 is configured to be connected to only one selected bit line during a read operation (e.g., by closing the set of switches connected to the selected bit line and opening the sets of switches connected to the other bit lines).

The terms "approximately," "about," and "substantially" as used herein may mean within a range of normal tolerance in the art, such as within 2 standard deviations of the mean, within ±20% of a target dimension in some embodiments, within ±10% of a target dimension in some embodiments, within ±5% of a target dimension in some embodiments, within ±2% of a target dimension in some embodiments, within ±1% of a target dimension in some embodiments, and yet within ±0.1% of a target dimension in some embodiments. The terms "approximately" and "about" may include the target dimension. Unless specifically stated or obvious from context, all numerical values described herein are modified by the term "about."

As used herein, a range includes all the values within the range. For example, a range of 1 to 10 may include any number, combination of numbers, sub-range from the numbers of 1, 2, 3, 4, 5, 6, 7, 8, 9, and 10 and fractions thereof.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

The terms "first," "second," "third," "fourth," etc. as used herein are meant as labels to distinguish among different elements and may not necessarily have an ordinal meaning according to their numerical designation.

The words "example" or "exemplary" are used herein to mean serving as an example, instance, or illustration. Any aspect or design described herein as "example" or "exemplary" is not necessarily to be construed as preferred or advantageous over other aspects or designs. Rather, the use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Reference throughout this specification to "an implementation" or "one implementation" means that a particular feature, structure, or characteristic described in connection with the implementation is included in at least one implementation. Thus, the appearances of the phrase "an implementation" or "one implementation" in various places throughout this specification are not necessarily all referring to the same implementation.

As used herein, when an element or layer is referred to as being "on" another element or layer, the element or layer may be directly on the other element or layer, or intervening elements or layers may be present. In contrast, when an element or layer is referred to as being "directly on" another element or layer, there are no intervening elements or layers present.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. An apparatus, comprising:
a plurality of bit lines intersecting with a plurality of word lines;
a plurality of cross-point devices, wherein each of the plurality of cross-point devices is connected to at least one of the plurality of word lines and at least one of the plurality of bit lines; and
at least one output sensor that generates a digital output representative of a sum of currents flowing through a first bit line of the plurality of bit lines, the output sensor comprising:
a first transistor serially connected to a second transistor; and
an analog-to-digital converter configured to output the digital output, wherein a drain of the first transistor is connected to an input of the analog-to-digital converter.

2. The apparatus of claim 1, wherein the drain of the first transistor is further connected to a drain of the second transistor.

3. The apparatus of claim 2, wherein the output sensor further comprises a first resistor, and wherein the drain of the first transistor is connected to the drain of the second transistor via the first resistor.

4. The apparatus of claim 2, wherein a gate of the first transistor is connected to a bit line reference voltage.

5. The apparatus of claim 4, wherein a source of the second transistor is connected to a voltage supply via a second resistor.

6. The apparatus of claim 1, further comprising a first plurality of switches configured to selectively connect the plurality of bit lines to a gate of the second transistor.

7. The apparatus of claim 6, further comprising a second plurality of switches configured to selectively connect the plurality of bit lines to a source of the first transistor.

8. The apparatus of claim 1, wherein the input of the analog-to-digital converter is further connected to a first terminal of a capacitor.

9. The apparatus of claim 8, wherein a second terminal of the capacitor is connected to ground.

10. The apparatus of claim 1, wherein the cross-point devices comprise at least one of a memristor, a phase-change memory (PCM) device, a floating gate device, a spintronic device, a ferroelectric device, or a resistive random-access memory (RRAM) device.

* * * * *